United States Patent
Marques et al.

(10) Patent No.: US 6,707,946 B1
(45) Date of Patent: Mar. 16, 2004

(54) PARTITION DECODING METHOD AND DEVICE

(75) Inventors: Ferran Marques, Barcelona (ES); Cristina Gomila, Menorca (ES); Antoni Gasull, Badalona (ES)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/555,051

(22) PCT Filed: Sep. 27, 1999

(86) PCT No.: PCT/EP99/07458

§ 371 (c)(1),
(2), (4) Date: May 22, 2000

(87) PCT Pub. No.: WO00/19376

PCT Pub. Date: Apr. 6, 2000

(30) Foreign Application Priority Data

Sep. 29, 1998 (EP) .............................. 98402395
Jul. 13, 1999 (EP) .............................. 99401761

(51) Int. Cl.$^7$ .............................. G06K 9/46; G06K 9/36
(52) U.S. Cl. .......................... 382/233; 382/238; 382/242
(58) Field of Search ........................ 382/233, 234–236, 382/238, 241–244, 256, 258, 103, 154; 375/240, 240.24

(56) References Cited

U.S. PATENT DOCUMENTS 5,727,091 A * 3/1998 Kinouchi et al. ........... 382/246

FOREIGN PATENT DOCUMENTS

EP 994004364 2/1999

OTHER PUBLICATIONS

P. Nunes et al, "Multiple Grid Chaincoding of Binary Shapes", Proceedings of Int'l Conf. on Image Processing, vol. 3, pp. 114–117, Oct. 26–29, 1997.

T. Minami et al, "Encoding of Line Drawings with a Multiple Grid Chain Code", IEEE Transactions of Pattern Analysis and Machine Intelligence, vol. PAMI–8, No. 2, Mar. 1986, pp. 269–276.

* cited by examiner

*Primary Examiner*—Leo Boudreau
*Assistant Examiner*—Duy M. Dang

(57) ABSTRACT

The invention relates to a method of decoding coded signals corresponding to successive segmented pictures, or partitions, divided into homogeneous regions to which specific labels are respectively associated. The partitions have been previously coded by means of a coding method comprising, for each partition to be coded, the steps of translating the picture of labels into a chain in which the elements are defined by means of their movements through successive basic cells, tracking inside each cell each contour from its initial point to its end by storing symbols corresponding both to the elements of said cell and to priorities between them, and repeating these two steps up to the end of each contour of the partition and coding the information corresponding to the chains of movements. The corresponding decoding method then comprises (A) a forward decoding step, provided for decoding within said chain symbols all contour points that are sure in the decoded partition and detecting local inconsistencies, and (B) a backward decoding step, provided for tracking in a backwards manner the decoded contours and solving said inconsistencies on the basis of marks introduced during the detection of these inconsistencies.

4 Claims, 17 Drawing Sheets

MM 153

MM 356

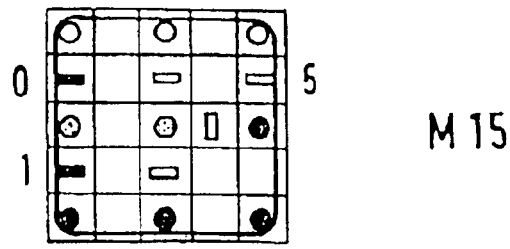
FIG. 20  M 15
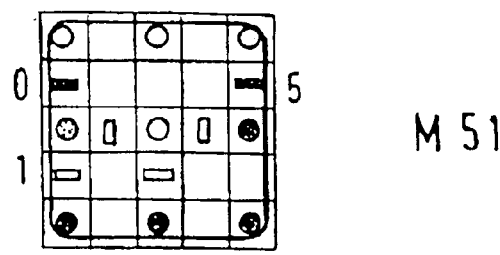
FIG. 21  M 51
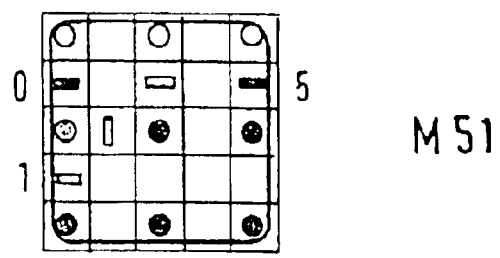
FIG. 22  M 51
— sure_input, sure_output, sure_link
▱ more_likely
▭ likely
✕ unlikely
✶ unsure
FIG. 26

PARTITION DECODING METHOD AND DEVICE

BACKGROUND OF THE INVENTION

1. Field of the Related Art

The present invention relates to a method of decoding coded segmented pictures, or partitions, divided into homogeneous regions to which specific labels are respectively associated, and to a corresponding decoding device. This invention has mainly applications in the field of the MPEG-4 standard, for instance for the implementation of MPEG-4 decoders.

2. Description of the Related Art

The multiple grid chain code approach (MGCC), described in the document "Multiple grid chain coding of binary shapes", by P. Nunes, F. Ferreira and F. Marqués, Proceedings of International Conference on Image Processing, vol. III, pp. 114–117, Oct. 26–29, 1997, Santa Barbara, Calif., USA, allows to efficiently encode binary shape information of video objects in the context of object-based video coding schemes. This approach relies on a contour representation of the partition. As shown in FIG. 1 that depicts a small general partition of size N×M with for example three regions to which respective labels are associated (in the present case, represented by grey, black and white circles), any pixel has four different contour elements associated. FIG. 2 shows the same partition as depicted in FIG. 1, but with the indication of the specific contour elements that define the changes between every pair of neighbour pixels that do not belong to the same region. FIG. 3 shows in a corresponding matrix of (2N+1)×(2M+1) sites the implementation of both grids: that associated to the pixel sites (=the circles) and that related to the contour sites (=the segments of lines). The contour elements that are situated between pixels of different labels are considered as active.

As illustrated in FIG. 4, an element of the contour grid may have up to six active neighbours: due to that, the contour grid is usually referred to as hexagonal grid. A conventional way to code the partition information in the contour grid is to select an initial point in the grid and to track the active sites up to finishing the contour. This method performs a lossless coding of the partition information, by encoding the movement from a current contour element to the following neighbour contour element (only three possible movements: straight, right, left).

Another contour tracking method is to move through the contour using larger steps, only contour elements linked by such larger steps being encoded: in the above-cited document, the described MGCC technique uses basic cells of 3×3 pixels, as the one illustrated in FIG. 5, where all contour and pixel sites in the cell are shown. For compression efficiency reasons, two types of cells are then used: counter-clockwise, as in FIG. 6, or clockwise, as in FIG. 7. The way to index the different contour elements in each type of cell is presented: the initial contour site is denoted by the symbol 0 and the other ones by the symbols 1 to 7, the symbol 1 being assigned to the site which is on the same side of the cell as the symbol 0. Consequently, to characterize a cell, three parameters are necessary: its initial contour site, its type (clockwise or counter-clockwise), and its orientation (=east or west for a cell with an horizontal initial contour element, north or south for a vertical one). The coding algorithm selects between each of these two types of cell in order to maximize the number of contour elements coded per cell.

The MGCC technique uses said indexing, as well as its possible rotations. Starting by the input element of the cell indexed with a 0 in FIG. 6, any output element from the set (1, 2, . . . , 6, 7) can be reached, but the way to go through the cell is not univocally defined by the output element: as shown in the example of FIGS. 8 and 9, a movement (in this case, from 0 to 4) may indeed correspond to two different contour configurations. The contour elements inside the cell (8, 9, 10, 11), not coded, introduce ambiguity in the coding process, two different sets of contour sites (0, 8, 9, 4) or (0, 11, 10, 4) being possible. This ambiguity introduces coding losses. Nevertheless, the only possible error is the erroneous labeling of the central pixel of the cell, i.e. only of an isolated boundary pixel.

In a contour tracking process, several cells are then linked up in order to complete the contour. To link two cells, the output contour site of the current cell becomes the input contour site of the following cell, as FIG. 10 shows. When coding with the MGCC approach the boundary of a single region, the bitstream thus generated therefore contains: (a) the position of the initial contour site, and (b) the chain of symbols representing the movements performed in order to track the contour.

In the contour tracking process, it is needed to change progressively the position of the basic cell through the grid. The proposed technique is described for instance in the article "Encoding of line drawings with a multiple grid chain code", by T. Minami and K. Shinohara, IEEE Transactions on Pattern Analysis and Machine Intelligence, vol. PAMI-8, n°2, March 1986, pp. 269–276. The basic principle of said technique is explained with reference to FIGS. 11 to 15.

As indicated indeed in FIG. 11 giving an example of coding with a fixed grid, a contour segment has been coded by means of the symbol 4 in the first cell (a counter-clockwise one). If cells of the same grid are used, the symbol 7 (FIG. 12) is used in the second cell for tracking the contour (the symbol 0 being always the new initial—or input—site), and the symbol 2 (FIG. 13) in the third one, these second and third cells being in that case clockwise ones. Three cells are therefore needed to track the contour from the first initial site. On the contrary, only two are needed if the grid (i.e, in fact, the position of the center of the cell) is changed: as shown in FIGS. 14 and 15 that illustrate a modification of the grid with respect to the example of FIGS. 11 to 13, only a second cell is now needed to go to the same output site.

This solution of FIGS. 14 and 15 leads to a more compact representation of the contour. However, three different classes of grids are then necessary to define the shift of each grid with respect to the origin of the corresponding cell (called GO) before said shift. These three classes G1, G2, G3 are defined, as indicated in the following classification table (Table 1) by the position (x, y) of the pixel which is the origin of each type of cell, with respect to the pixel which is the origin of said corresponding cell:

TABLE 1

| GRID | SHIFT WITH RESPECT TO THE ORIGIN OF THE REFERENCE GRID GO: |
|---|---|
| G0 | (0, 0) |
| G1 | (1, 0) |
| G2 | (0, 1) |
| G3 | (1, 1) |

In the example of FIG. 10, a cell of the class G2 was used, with respect to the corresponding current cell GO. In another example illustrated in FIG. 16, a cell of the class G1 is used, with respect to the corresponding current cell GO.

However, the MGCC approach previously described can only be used to code binary partitions. In case of general segmented pictures, the partitions contain regions that share contours. A more appropriate approach is then described in the european patent application N°99400436.4 (PHF995 11), filed on Feb. 23$^{rd}$, 1999, that relates to a method of coding segmented pictures, or partitions (divided into homogeneous regions to which specific labels are respectively associated), comprising, for each successive partition, the steps of:

(a) translating the picture of labels into a description in terms of a contour element chain in which the elements are defined by means of their movements through successive basic cells, between an input point and an output point of said cells;

(b) tracking inside each successive cell each contour from its initial contour point, previously extracted, to its end by storing chain symbols corresponding both to input, internal and output contour elements of said cell and to priorities between multiple outputs elements;

(c) repeating these steps up to the end of each successive contour segment of the concerned partition;

(d) coding the information corresponding in each cell to the initial point of each contour segment and to the associated chain of movements between that initial point and the initial one of the following cell.

These successive steps define a so-called intra-mode coding process of image partitions. By introducing the concept of triple point at the intersection of two different contours, which allows to locate the initial point (or starting contour site) of a new contour (not yet coded) with respect to a previous one, and by introducing for these triple points a new symbol in the coding chain, an efficient coding is obtained: while the MGCC approach tracks the contour chaining cells, triple points will be replaced, in the present case, by the concept of cells with multiple outputs.

Two other embodiments (with respect to this basic implementation) are described in the application N°99400436.4 already cited. They are related to the extension of the basic implementation to the cases of scalable partition and inter-mode partition sequence coding respectively. According to the first one, each current partition is divided into a basic layer and at least an enhancement one, and the described intra-mode coding process is successively applied to the basic layer without any change and to the enhancement layer with the following modifications: in the extraction step, the initial points of contour segments are associated to contour points from the basic layer; in the tracking step, all the points belonging to the basic layer are withdrawn; and, in the repeating step, the closing of a contour before processing the following one is associated to contour points of the basic and enhancement layers. According to the second embodiment, each current partition is divided into a first part, including some regions that need to be coded in intra-mode, and a second part, corresponding to the other regions to be motion compensated, and the intra-mode coding process is applied to said first part playing the role of the basic layer, while an associated inter-mode coding process is applied to said second part playing the role of the enhancement layer.

The flowchart of FIG. 17 corresponds to the basic implementation. The main steps of the illustrated process are the following: generation of the contour image, extraction of the initial points from the picture, cell characterization, contour tracking, determination of the priority in the contour tracking, management of the multiple points, end of process, and extraction of the next initial point, these steps being followed by the final coding steps.

The first step 401 allows to generate the contour pictures that will be later coded. The original partitions, described in terms of pictures of labels, are translated into a description in terms of contour elements defined with the above-described hexagonal grid. The second step 402 is provided for extracting all the initial contour points from the picture. The first contour to be considered is the contour of the frame of the picture: since the receiver will already know the shape of such a picture frame, the only information that has to be coded from this frame contour is the positions of the initial points that will define the starting of new contour segments. Contour points contacting this frame (in fact, the characteristics of the cell having as input contour these specific contour points) are stored in a buffer (a First-In, First-Out, or FIFO, queue) and called "PENDING" points, in view of a specific treatment as seen later.

The third step 403 is a cell characterization one. Once the initial point of a contour has been selected, the cell defined by that point has to be characterized. For all initial points, the class of grid is set to GO (see the previous classification, called TABLE 1). In the case of an initial contour point contacting the frame contour, the side of the frame where said point is located fixes the orientation and type of the cell as shown in Table 2 (where c and cc respectively mean clockwise and counter-clockwise);

TABLE 2

| INITIAL POINT | ORIENTATION | CELL TYPE |
| --- | --- | --- |
| top side | S (= south) | c |
| right side | W (= west) | c |
| bottom side | N (= north) | c |
| left side | E (= east) | c |
| interior | E (= east) | cc |

As can be seen, in the case of an initial point of an interior cluster of regions, due to the scanning adopted, the type is set to "counter-clockwise" and the orientation to "east". In the case of a cell whose input contour site is neither a contour point contacting the frame nor the initial point of a cluster, its characterization depends on the prediction based on the movement performed in the previous cell. This way, the input contour of the current cell is the output contour of the previous one, and the assignment of orientation and cell type follows the rules indicated in Table 3, in which the second row (N, E, S, W, c, cc) represents the data of the current cell;

TABLE 3

| | CURRENT CELL ORIENTATION | | | | CURRENT CELL TYPE | |
| --- | --- | --- | --- | --- | --- | --- |
| OUTPUT | N | E | S | W | clockwise | c-clockwise |
| 1 | S | W | N | E | c | cc |
| 2 | W | S | E | N | cc | c |
| 3 | W | S | E | N | cc | c |
| 4 | N | E | S | W | c | cc |
| 5 | N | E | S | W | c | cc |
| 6 | E | N | W | S | c | cc |
| 7 | E | N | W | S | c | cc |

Once a cell has been characterized, the contour information in the cell has to be stored in the chain of symbols. A contour tracking step 404 is then provided. In said step, only those contour elements that are linked to the initial contour of the cell are taken into account, the other ones inside the cell (not linked to said initial contour) being withdrawn and analyzed later during the racking process. Starting by the input contour, the tracking is carried out with the following priority: straight-right-left, so that a list of output contours linked with the input contour is created. During this tracking operation, input and output contour points are marked as "INOUT", and the other contour points inside the cell, necessary to link the input and output contours but which are neither input nor output sites, are marked as "INTERNAL". This step 404 of contour tracking inside the cell is illustrated in FIGS. 18 and 19. An original cell is presented in FIG. 18: since the outputs 5 and 6 are not connected to the input, they are withdrawn in FIG. 19. The contours that have been detected have then to be stored in the chain of symbols. If only one output contour is found, the movement linking the input to the output contour is stored; if multiple output points are detected, the cell will require more than one symbol to code the contour configuration.

A priority determination step 405 is then provided. In that step, the sub-chain describing the contour information in the cell starts with a symbol M (corresponding to "multiple output"), for each additional output. Thus, if the sub-chain of a cell starts with n symbols M, the following (n+1) symbols describe its different active outputs. The set of output contours is stored in the chain in a specific order. The symbol related to the output contour with the highest priority is introduced in the chain just after the set of symbols M and will be the input contour for the next cell (if the contour is not closed). The highest priority symbol is fixed by the length of the contour segment that links the input contour with each one of the output contours: it is the symbol corresponding to the longest path, which has the advantage of maximizing the number of contour elements coded per cell. If two contour segments have the same length, the ambiguity is solved by taking into account the tracking priority indicated previously: straigth-rigth-left. The other output contours are not ordered based on the length criterion, but on the basis of the tracking priority (straight-right-left).

Examples are given for a better understanding. The ordering of two output contours is shown in FIGS. 20 to 22. In FIG. 20, the longest path leads to the output 1, and the symbols in the chain are therefore M15. In FIG. 21, the longest path leads to 5: the symbols are now M51. However this set of symbols does not result in a unique cell configuration, since the third example of FIG. 22 leads to the same representation M51. In this last case, the paths leading to both outputs (5 and 1) have the same length: relying then on the tracking priority, the resulting chain is therefore M51.

For the case of a sub-chain with n symbols M, two examples of cells with multiple outputs are given in FIGS. 23 and 24. The example of FIG. 23 corresponds to a cell with two triple points. The chain of symbols describing the contour information of this cell is MM 153 (although the path leading to the output 3 is longer than that leading to the output 5, said symbol 5 appears first in the sub-chain: it is due to the ordering of the non-priority symbols, which is based on the tracking priority rather than on the length criterion). In the example of FIG. 24, where a quadruple point is present, the chain of symbols describing this cell contour information is MM 356 (the path leading to 3 is the longest one, and the tracking priority gives the priority to 5 with respect to 6).

When a multiple output is observed in a cell, a specific symbol is therefore included in the sub-chain, as it has just been described. This operation is followed by a multiple point management step 406. During said step, the output with less priority (unless it closes the contour segment) is stored in a buffer of pending points (a FIFO queue), and all output points that are stored in that manner in the buffer receive the mark "PENDING". The reason of such a marking operation is that not all the points that are stored in the buffer will be needed in the future to refer to a new contour segment. During the tracking process, a new cell may indeed contain a contour point previously marked as "PENDING". In this case, the segment that was associated to this "PENDING" contour point has been already completed and the corresponding multiple point has to be removed from the chain (when erasing the effect of a multiple point from the chain, two symbols have to be removed: the symbol M of multiple point is first cancelled, and the movement that linked the input of the cell with the multiple output associated is then removed, which leads for instance to have only the single symbol 3 in the sub-chain if the information in a cell was previously encoded with the sub-chain M35, and a new cell covers the second output related to the movement towards 5). In addition, the concerned output contour has to be removed either from the buffer of possible initial points, if it contacts the frame, or from the buffer of "PENDING" points. Finally, the mark of the former output point—that associated to the movement towards 5—has to be updated. If the new cell has this contour point as an output, its mark moves from "PENDING" to "INOUT". If the new cell has this contour point as an interior contour point, its mark moves from "PENDING" to "INTERNAL".

The last step of the tracking process, designated in FIG. 17 by the reference 407, is provided for ending a contour (test 471), a cluster (test 472), or the partition (test 473). The end of a contour segment relies on the contour elements previously marked as "INOUT" during the tracking process. When an output contour in a cell coincides with a contour marked as "INOUT", this branch of the contour segment is closed. If the output contour is that of highest priority, the end of the contour segment is reached (at the decoder side, this will allow to close contours on known contour sites and prevent possible splitting of regions). Moreover, if the output contour is marked as "INTERNAL" or "PENDING" but any of the following contour sites that can be reached from it is an "INOUT" one, the contour (or the branch) is ended as well. When a contour segment ends, one has to check whether the cluster of regions has been finished. The buffer of "PENDING" points is checked first, in order to see whether there are any further "PENDING" points in it or all of them have been already extracted. If there are no "PENDING" points left, the buffer of possible initial points (initial points contracting the frame) is checked (the reason for extracting first those contours from the buffer of "PENDING" points is for coding efficiency purpose). If both buffers are empty, the cluster is finished and a new one (if any) is similarly considered. As previously said, the picture is scanned in a raster manner (from top to down and from left to right), and the first non-coded active contour is taken as the initial point for a new cluster of regions. If there are no more non-coded active contours, the whole partition has been coded.

This last step of the tracking process is therefore subdivided into the three sub-steps 471 to 473. As long as a contour is not ended (test 471), a backward connection allows to repeat the steps 403, 404, 405, 406. As soon as a contour is ended, the test "end of cluster" is undertaken (test 472). As long as the cluster of regions is not finished, the following procedure is carried out. The buffer of "PENDING" points is checked (operation 74: recuperation of a stored pending point), in order to see whether there are further "PENDING" points in it. If all of them have been already extracted, the buffer of possible initial points contacting the frame is checked (the reason for extracting first these contours from the buffer of "PENDING" points is for coding efficiency purposes). If both buffers are empty, the cluster is finished, and a new cluster of regions is considered (operation 73: extraction of the next initial point). When there are no more non-coded active contours (test 473), the whole partition has been processed.

The whole partition being processed, the last step of the partition coding method is an entropy coding step 408, including a first coding sub-step 481 for coding the information of initial points and a second coding sub-step 482 for coding the chain of movements.

For the implementation of the sub-step 481, it is necessary to distinguish between the external initial points and the internal ones. All the initial points contacting the frame (i.e. referring to the first cluster) are coded together as a header of the first chain of movements. For each initial point contacting the frame, the position of the point of the frame previous to said initial point is coded. These initial points are indexed thanks to two different word lengths: P bits are used for the horizontal dimension of the picture (top and bottom sides) and Q bits for the vertical one (left and right sides), with for instance $P=\log_2[dim\_x]$ and $Q=\log_2[dim\_y]$. If there are finally no remaining points to be coded on one side of the frame, a specific word is used to indicate this situation (for instance, $P_T$ or $Q_T$). When the last initial point contacting the frame has been coded, another specific word (for instance, $P_o$ or $Q_o$) is used to indicate the start of the chain of movements. If there are no initial points on the frame, the word $P_o$ precedes the code, called "intern_ip", of the first internal initial point. The way to code these various situations, corresponding to different numbers of initial points on the four sides of the frame, is indicated in Table 4 (bot=bottom):

TABLE 4

| P_top | P_right | P_bot | P_left | Header of initial points |
|---|---|---|---|---|
| 0 | 0 | 0 | 0 | $P_o$ intern_ip |
| m | 0 | 0 | 0 | $P_1 \cdots P_m P_o$ |
| m | n | 0 | 0 | $P_1 \cdots P_m P_T Q_1 \cdots Q_n Q_o$ |
| m | n | p | 0 | $P_1 \cdots P_m P_T Q_1 \cdots Q_n Q_T P_1 \cdots P_p P_o$ |
| m | n | p | q | $P_1 \cdots P_m P_T Q_1 \cdots Q_n Q_T P_1 \cdots P_p P_T Q_1 \cdots Q_q Q_o$ |

Internal initial points are similarly indexed. As they have been obtained by scanning the image from top to bottom, an internal initial point always corresponds to an horizontal contour site. Only the horizontal contours are therefore indexed.

The previous description was related, as indicated, to a coding method that allows to code segmented pictures according to a generalized MGCC approach. When the coded signals thus obtained are transmitted (and/or stored), they must be finally decoded, after the transmission step. The main objective of an MGCC decoding method and device provided to that end must then be to ensure the same number of regions in the decoded partition with respect to the original one.

However, when carrying out the coding method, owing to the fact that this encoding process is local (i.e. done cell by cell), the possible uncertainty in the central pixel of each cell may lead, when analyzing the whole partition at once, to inconsistencies in the decoded contours: new regions may be created, or regions may be split, so that the decoded contours are no longer in accordance with the original bitstream.

In order to face this problem, it would be possible to decode the sub-chain of information from each cell taking into account all the previously decoded contours, and then to verify at each step that the complete decoded contours remain in accordance with the original bitstream. Such an approach increases the complexity of the decoder, since the whole image has to be analyzed in order to decode the information of every cell. If the sub-chain of information from every cell is on the contrary decoded only taking care of the previous contour information contained in the local area covered by the cell, possible inconsistencies can be solved, but, when solving them, new ones may be created in a previous cell because this second approach does not ensure the number of scannings needed to solve any possible inconsistency, and a further scanning will be necessary to solve this new problem.

SUMMARY OF THE INVENTION

It is therefore an object of the invention to propose a partition decoding method with a lower complexity and however efficient for avoiding inconsistencies in the decoded contours.

To this end, the invention relates to a decoding method such as defined in the introductory paragraph of the description and which is moreover characterized in that is comprises:

(A) a forward decoding step, provided for decoding within said chain symbols all contour points that are sure in the decoded partition and detecting local inconsistencies;

(B) a backward decoding step, provided for tracking in a backwards manner the decoded contours and solving said inconsistencies on the basis of marks introduced during the detection of these inconsistencies.

The basic principle of said decoding method is to divide the decoding process into two main steps: a forward decoding step and a backward decoding one, both working at cell level (as the coding method having allowed to obtain the signals to be decoded). The first step, the forward decoding one, is provided mainly for fixing all the contour points that are sure and for detecting inconsistencies, while the backward decoding step is provided for solving these inconsistencies relying only on specific marks introduced during the forward decoding step, without having to store the original coded bitstream which is not used during this second step.

BRIEF DESCRIPTION OF THE DRAWINGS

The particularities and advantages of the invention will now be explained in a more detailed manner, with reference to the accompanying drawings in which:

(A) FIGS. 1 to 24 illustrate an MGCC coding technique allowing to generate the coded signals that will be processed using the decoding method according to the invention:

FIG. 1 shows an example of partition of size M×N (in this case, with M=N=5) and FIG. 2 the same partition with the contour elements that define the boundaries between the different regions;

FIG. 3 associates the grid corresponding to the pixel sites and the one associated to the contour sites;

FIG. 4 is a representation of the six active neighbours of a contour element of the contour grid;

FIG. 5 shows a basic cell of 3×3 pixels, used in the MGCC technique;

FIGS. 6 and 7 illustrate the way to index the contour elements for a counterclockwise cell and a clockwise one, and FIGS. 8 and 9 show, for the same input and output elements of a cell, two different contour configurations in said cell;

FIG. 10, FIGS. 11 to 13, FIGS. 14 to 15, and FIG. 16 illustrate two distinct solutions to link cells for a contour tracking process;

FIG. 17 is a flowchart illustrating a complete scheme of said MGCC encoding technique generating the coded signals to be now processed according to the invention;

FIGS. 18 and 19 illustrate, in said encoding method, the step of contour tracking inside a cell of the grid, and FIGS. 20 to 22 illustrate how to order two output contours during the priority determination step;

FIGS. 23 and 24 give two examples of cells with multiple outputs;

(B) FIGS. 25 to 50 are related to the partition decoding method according to the invention:

FIG. 25 is a flowchart illustrating a scheme of an embodiment of the partition decoding method according to the invention, and FIG. 26 shows a set of marks that will be useful for describing all the figures illustrating the behaviour of said decoding method;

FIGS. 27 to 36 show a set of contour configurations helpful for understanding the contour generation sub-step of said decoding method;

FIGS. 37 and 38 show an example of the type of conflict which may occur during the error control sub-step of the decoding method, and FIGS. 39 to 41 illustrate some situations during this sub-step;

FIGS. 42 to 45 illustrate a kind of contour configuration that leads to an inconsistency in the implementation of the decoding method;

FIGS. 46 to 49 illustrate another embodiment of the partition decoding method according to the invention;

FIG. 50 illustrates very schematically the successive steps and sub-steps of the scalable-mode decoding approach.

DETAILED DESCRIPTION OF THE INVENTION

Figure 1:
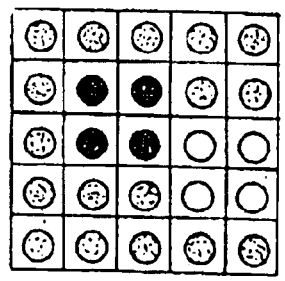
Figure 2:
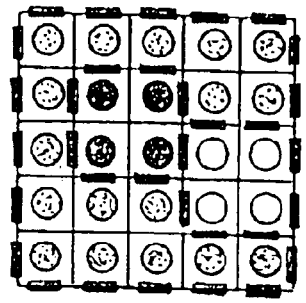
Figure 3:
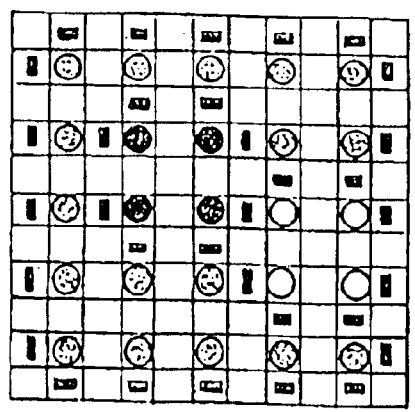
Figure 4:
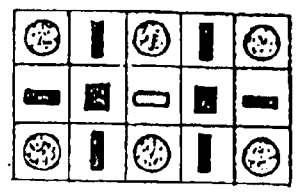
Figure 5:
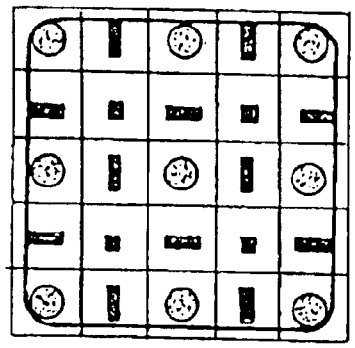
Figure 10:
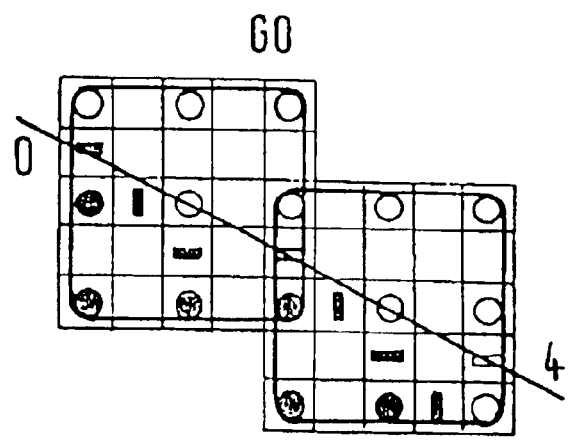
Figure 6:
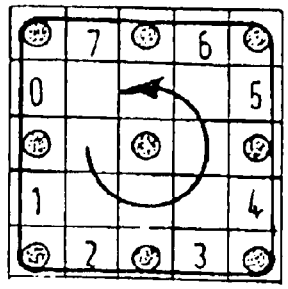
Figure 7:
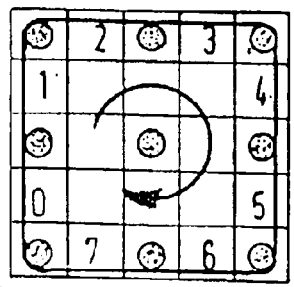
Figure 8:
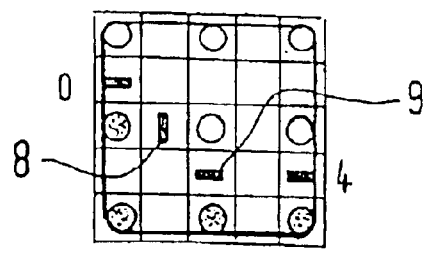
Figure 9:
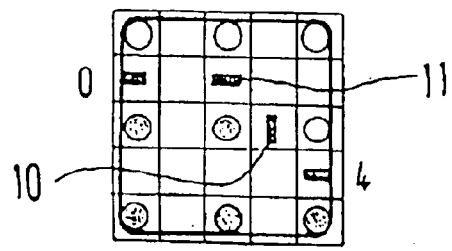
Figure 11:
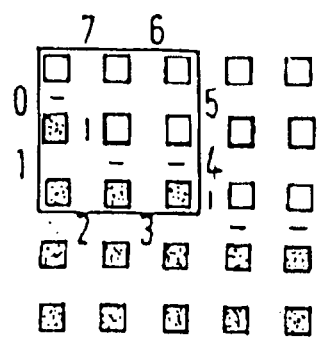
Figure 12:
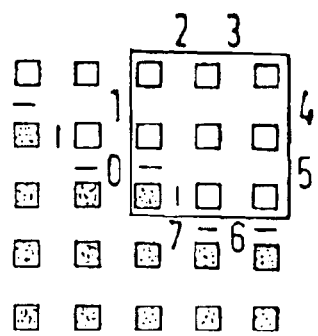
Figure 13:
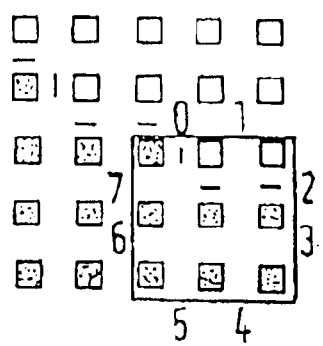
Figure 14:
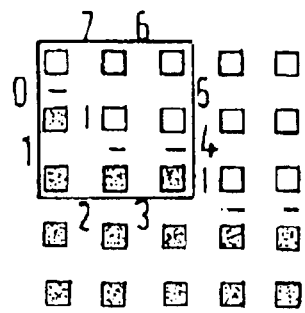
Figure 15:
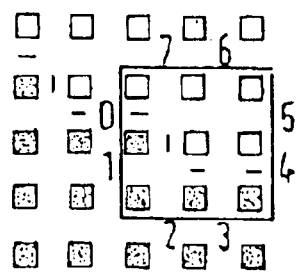
Figure 16:
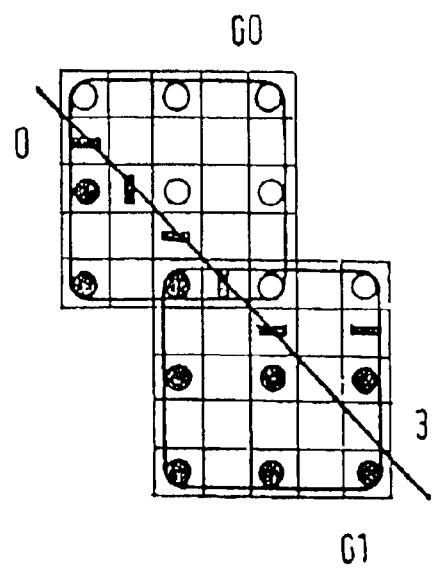
Figure 17:
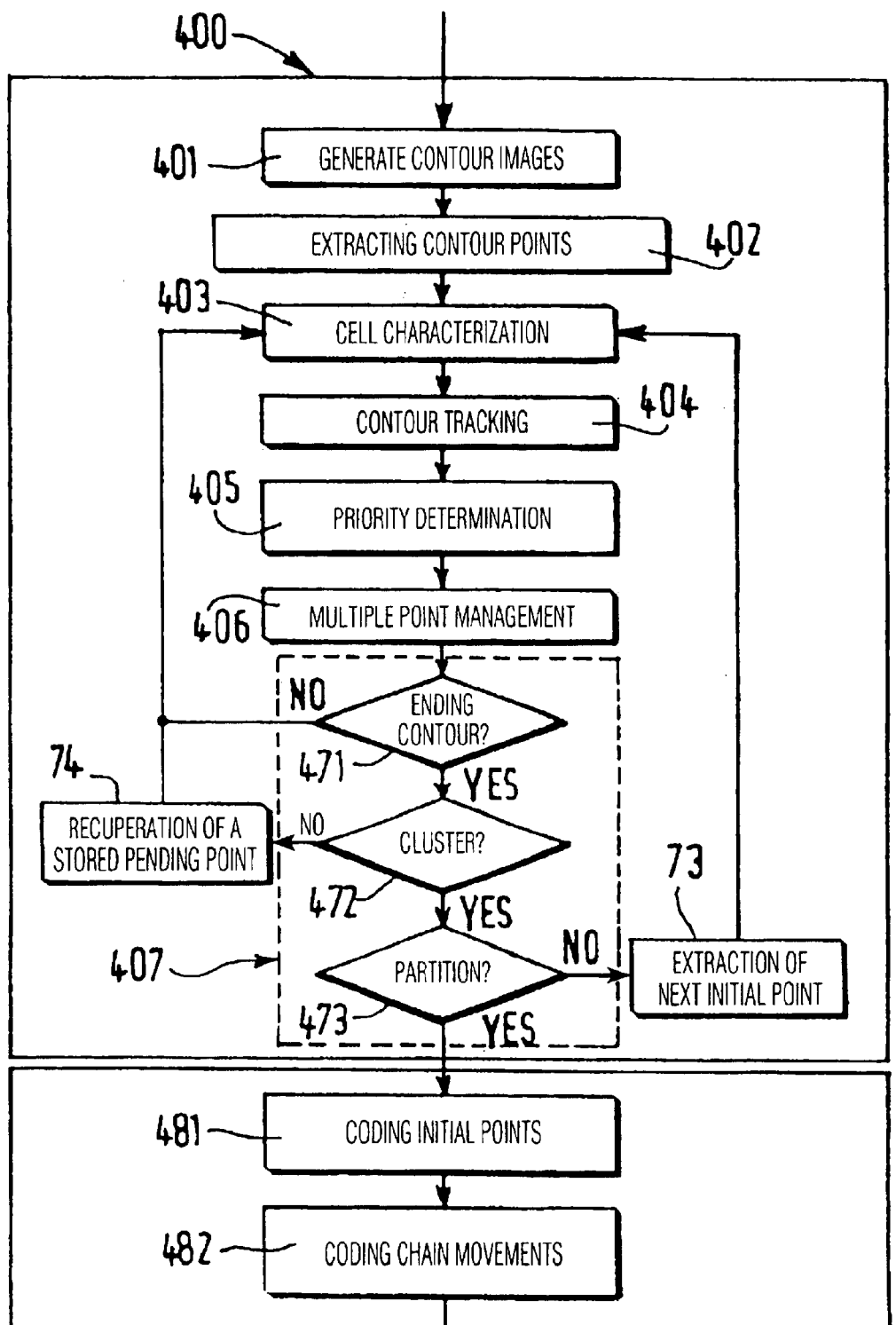
Figure 18:
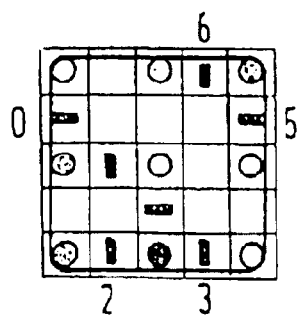
Figure 19:
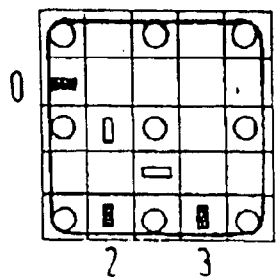
Figure 23:
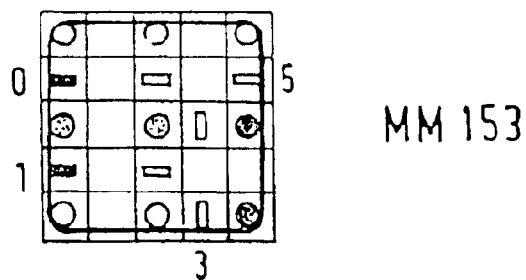
Figure 24:
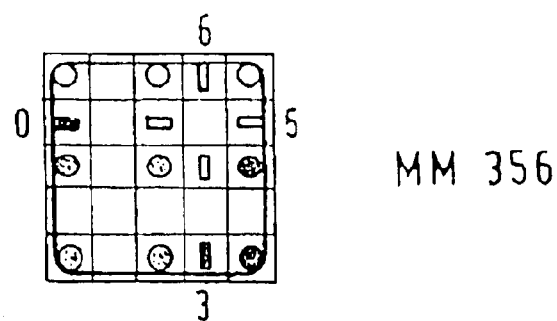
Figure 25:
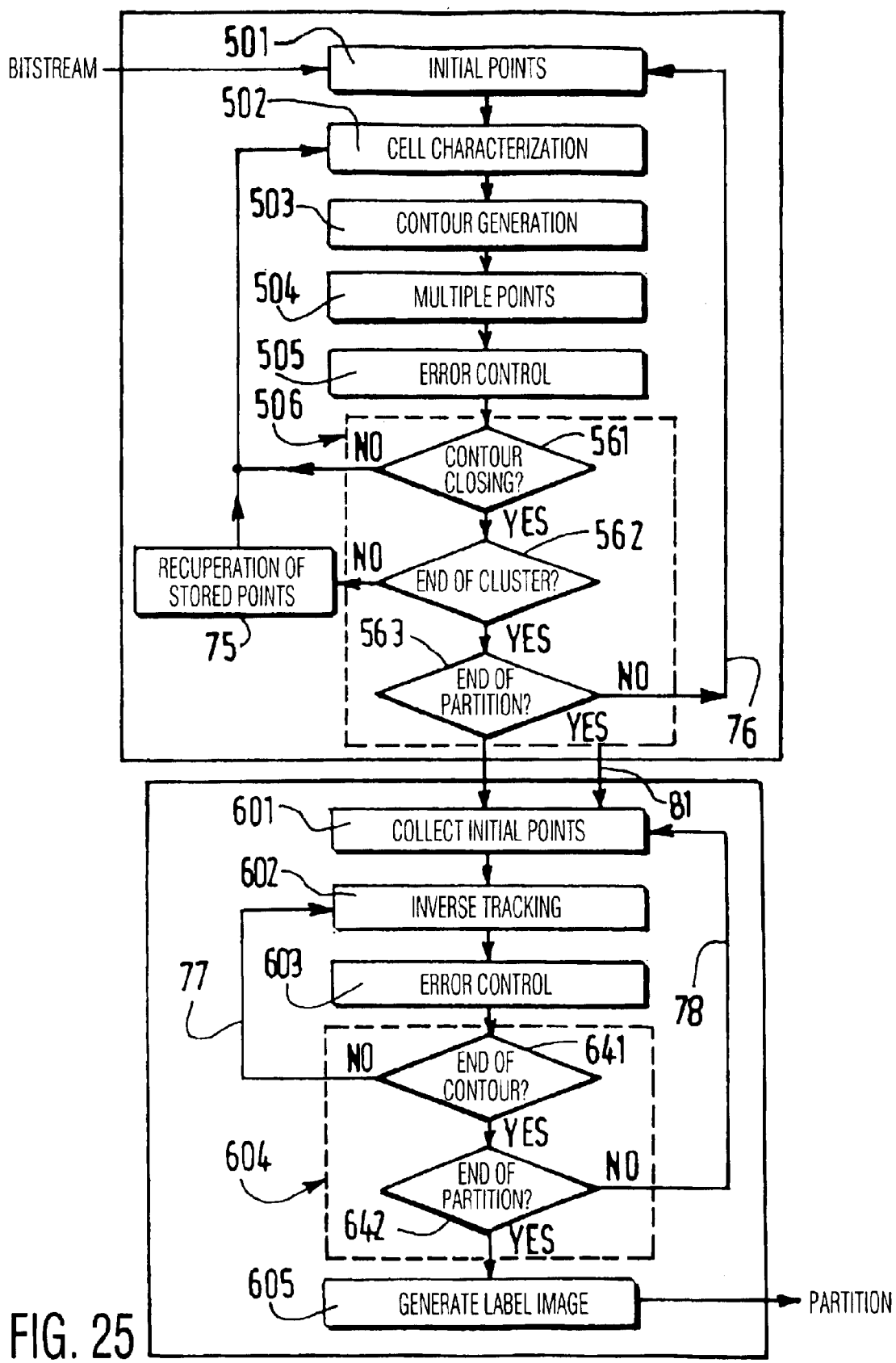
Figure 27:
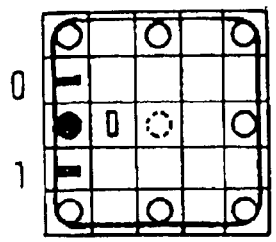
Figure 28:
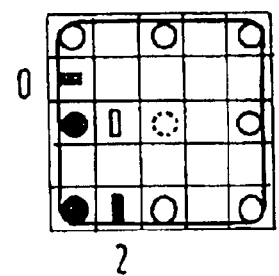
Figure 29:
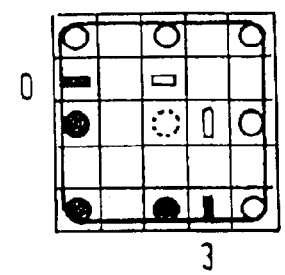
Figure 30:
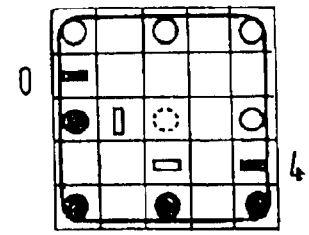
Figure 31:
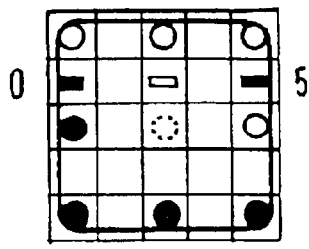
Figure 32:
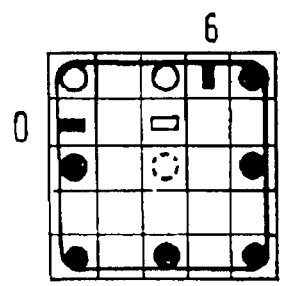
Figure 33:
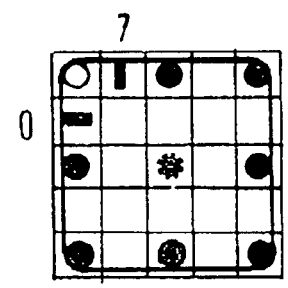

In the flowchart of FIG. 25, that corresponds to a basic scheme of an MGCC intra-mode decoding method according to the invention, the main sub-steps of the forward decoding step are the following: management of the initial points, cell characterization, contour generation in the cell, management of the multiple points, error control, end of process, while the main sub-steps of the backward decoding step are the following: recuperation of a closing point, detection of the inverse tracking, error control, end of process, and generation of the final image.

The first sub-step 501 of the forward decoding step is provided for selecting the initial points. The first part of the input bitstream forming the symbol chain always contains the position of the first initial point. If there are several contour segments starting from the frame of the current picture, the first one is selected as initial point and the other points are stored in a buffer of initial points contacting said frame. If there are no contour starting from the frame, the first information in the chain is the position of the initial point of an interior cluster of regions.

The second sub-step 502 is a cell characterization one. The cells whose input point corresponds to an initial point are characterized according to the same set of rules as defined in Table 2 (step 403). For cells whose input contour is not an initial point, they are characterized in the same way as indicated in the encoding part (see Table 3).

The third sub-step 503, provided for the contour generation in each cell, uses both the information contained in the sub-chain associated to a cell and the contours already available in the area covered by this cell to make a proposal of the contour configuration described by said sub-chain. In this proposal, contour elements are located in the cell and marks are assigned to them. These marks are:

sure_input: the input contour site for each cell which is sure to belong to the original partition;

sure_link: a contour site laying in the interior of the cell that, due to the contour configuration in the decoding process, is sure to belong to the original partition;

sure_output: the output contour site for each cell which is sure to belong to the original partition;

sure_not: a contour site laying in the interior of the cell that, due to the contour configuration in the decoding process, is sure not to belong to the original partition;

likely: a contour site in the interior of the cell that, since it leads to a smooth contour configuration, is proposed as first solution for the contour inside the cell, unlikely: a contour site in the interior of the cell that, since it does not lead to a smooth contour configuration, is not proposed as first solution for the contour inside the cell.

Obviously, in this sub-step 503, previously decoded contour elements (i.e. contour already available in the area covered by the cell and therefore coming from the decoding of previous sub-chains) cannot change their position or their mark. In all figures illustrating the behaviour of the decoding method, the set of marks will be shown as presented in FIG. 26.

The first proposal for the sub-chains containing a single symbol (1, 2, . . . , 7) is given by the set of contour configurations shown in FIGS. 27 to 33. The uncertainty in the central pixel, represented as a dashed circle in all the examples in the following description and figures, has been solved by adopting the smoothest configurations, which are the most likely to appear in original partitions (this however depends on the segmentation method that has been used for creating the partitions, and this choice can therefore be changed).

The input contour for each cell is marked as "sure_input", and the output contour as set "sure_output". In fact, the mark "sure_input" does not correspond to a single value but to a set values that indexes the order according to which the different input contours are chained. This way, when a cell is initialized, the index is updated (sure_input=sure_input+1) and the input point receives the updated index sure_input.

On turn, if the input has the mark "sure_output", it should be updated to the new index value "sure_input", which will be necessary to allow the inverse tracking during the backward decoding step. Furthermore, the characterization of the inverted cell (i.e. its type and orientation) is stored in a buffer (here, a FILO, or First-In-Last-Out, queue) of cell characteristics, in order to help the inverse tracking. A simple rule to obtain the inverse orientation of the current cell relies on the estimation of the orientation of the following cell. The rules to pass from a direct to an inverted cell characterization are shown in Table 5;

TABLE 5

| | FOLLOWING CELL ESTIMATED ORIENTATION | | | | CURRENT CELL TYPE | |
|---|---|---|---|---|---|---|
| output | N | E | S | W | c-clockwise | clockwise |
| 1 | S | W | N | E | cc | c |
| 2 | S | W | N | E | c | cc |
| 3 | S | W | N | E | cc | c |
| 4 | S | W | N | E | c | cc |
| 5 | S | W | N | E | cc | c |
| 6 | S | W | N | E | c | cc |
| 7 | S | W | N | E | cc | c |

Figure 34:
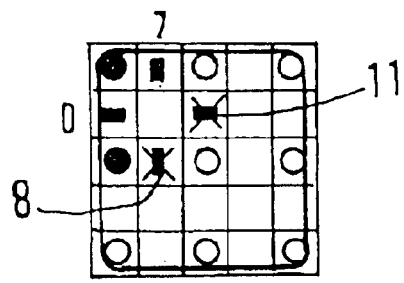

Depending on the contour configuration, some contour sites are marked as "sure_not": they cannot belong to the final partition, since the sub-chain defining the cell prevents them to be active. Considering the cell presented in FIG. 34, that gives an example of this type of configurations, the sub-chain contains only the symbol 7 and, therefore, neither the contour site 8 nor the 11 can be active (they would yield a multiple point): these contour points can be marked as "sure_not" (if the multiple point really existed, it would have appeared in the chain as M X 7, since 7 is the shortest possible path and any other possible output "X" would have a higher priority).

The contour elements laying in the interior of a cell (8, 9, 10, 11) that are proposed to connect the input contour with the output contours are marked as "likely", and those not proposed are marked as "unlikely". This decision is adopted analyzing all the information in the area covered by the cell. Initially, given a sub-chain, the set of configurations proposed in FIGS. 27 to 33 is adopted. If the sub-chain contains more than one symbol and presents uncertainty, it is decoded as a contour configuration leading to the minimum number of contour elements; if it does not present any uncertainty (see the case of M15 discussed in relation with FIG. 20), the interior contour points are marked as "sure_link".

Figure 35:
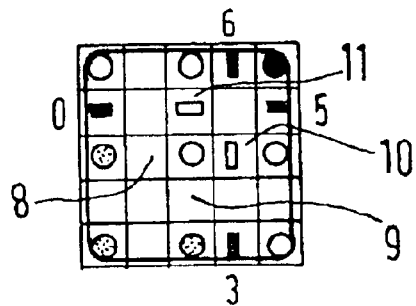
Figure 36:
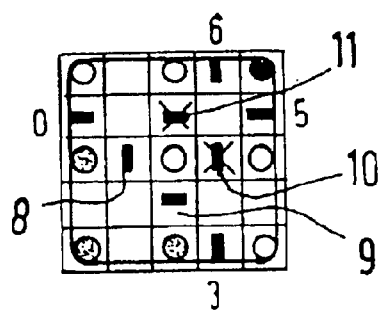

The initial contour configuration is combined with the other contour information already present in the cell, and the conformance of the final contour configuration with respect to the sub-chain is checked. After said global analysis of the cell, the proposed contour configuration may change. In FIGS. 35 and 36, an example of configuration analysis is presented. The symbol received is a 3 and the cell already had the contour sites 5 and 6 marked. If the initial configuration were adopted, the path down to the contour site 3 would lead to multiple outputs that do not appear in the sub-chain (see FIG. 35). The proposal of interior contours is therefore modified and the second possible configuration for the symbol 3 is taken (see FIG. 36). The final marks of the interior contours depend on the marks of contour elements 5 and 6: as, in the example of FIGS. 35 and 36, the elements 5 and 6 are marked as "sure_input", "sure_link" or "sure_output", the elements 8 and 9 are marked as "sure_not" and elements 10 and 11 as "sure_link" (since this will be the only possible configuration: see FIG. 36), while, if the elements 5 and 6 were marked as "likely", the elements 8 and 9 would be marked as "unlikely" and the elements 10 and 11 as "likely" (since there would not be enough information to fix the configuration, and the proposed one being then coherent with the previous and current sub-chains).

Considering the whole contour generating sub-step 503 hereinabove described, it must be noted that, since the decoding method according to the invention takes advantage of the previously decoded symbols, the more dense the partition, the lower the amount of uncertainty in the decoding process.

Obviously the transmitted sub-chain of a cell may contain symbols of multiple point. According to the fourth sub-step 504, provided for the management of such multiple points, the output points associated to said symbols are stored in the buffer of initial points. Nevertheless, if such an associated output point corresponds to a pixel marked as "sure_input" or if any of the following contour sites that can be reached from it is a "sure_input, the multiple point is denoting that this branch of the contour is closing a contour, and the output point does not have to be stored since it will not be necessary to locate the initial point of any future contour segment (the way to handle a closing is described later in a more detailed manner, in relation with the description of the sixth sub-step 506).

It must also be noted that the third sub-step 503, in charge of the contour generation in each cell, does not always avoid problems within the cells, since it is only allowed to vary the location and the value of the current contour points, but not those of the previous ones. A fifth sub-step 505 is then provided for an error control. In said step, configuration that are not compliant with the sub-chain are detected, and contour marks are removed (i.e. contour segments are opened) in order to prepare the chain in view of the backward decoding step that will solve the conflicts. Said conflicts are due to the existence of previously decoded contours whose marks do not allow the correct decoding of the current sub-chain. In this case, the contour sites from the previous sub-chain creating the inconsistency must have the mark "likely". The way to make explicit that the cell is not compliant with the previous sub-chains is by means of an updating operation of the marks of these contour points to "unlikely" or to "sure_not" (i.e. by opening the contour segment). The final solution to this problem is postponed since it requires a more global vision of the partition structure, only possible during the backward decoding step.

Figure 37:
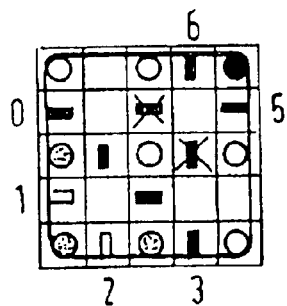
Figure 38:
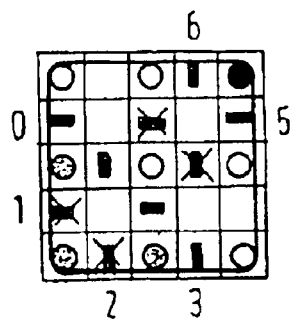

An example of this type of conflict is shown in FIGS. 37 and 38. In FIG. 37, the sub-chain has an unique symbol 3 and, in the cell, the contour elements 1 and 2 were previously marked as "likely" and the contour elements 5 and 6 as "sure_input", "sure_link" or "sure_output". The contour generation sub-step 503 has changed the contour configuration of the symbol 3 and has marked the contour elements 8 and 9 as "sure_not" and the contour elements 10 and 11 as "sure_link". However, the new configuration still leads to a multiple point, as shown in FIG. 37. The elements 1 and 2 are marked as "sure_not" in FIG. 38, opening the contour segment in order to show the presence of an inconsistency in the decoded partition.

A sixth and last sub-step 506 is provided, in the forward decoding step, for closing a contour (test 561: contour closing?), a cluster (test 562: end of cluster?) or the partition (test 563: end of partition?). When the movement with the highest priority in the sub-chain leads to a contour pixel marked as "sure_input" or "frame" or when one of the following neighbours of this pixel is a contour pixel marked as "sure_input" or "frame", the contour is closed, and this point receives the mark of "sure_output". However, if it corresponds to an actual "sure_input", its mark should not be changed, since the order of the indexing would be lost during the backward decoding step. Furthermore, the contour elements associated to the highest priority in the cell and marking the closing of a contour have to be stored in a buffer of closing points (a FILO queue), since they will be used as initial points in the inverse tracking of the backward decoding step.

When a contour segment ends (as long as it is not ended, a backward connection towards the sub-step is provided), it is checked whether the cluster of regions has been finished as well (test 562). The buffer of initial points is checked first, in order to see whether there are further initial points in it or whether all of them have been already extracted. If the buffer of initial points is finished, the buffer of initial points contacting the frame is then checked. If an initial point is extracted from any of these buffers, the initial contour updates its mark from "sure_output" to "sure_input". However this initial contour does not receive the following value of the index "sure_input", but that of the following index value plus one ("sure_input"+1). The reason for that jump in the indexing ordering will be seen later, in relation with the closing sub-step of the backward decoding step. If there are still initial points (end of cluster? NO), a sub-step 75 of recuperation of the stored point takes place, and a backward connection towards the sub-step 502 is provided. If there are no initial points left, the cluster is finished and the next information in the chain is related to a new initial point of another cluster (backward connection 76). If there are no more symbols in the chain, the forward decoding step has finished (end of partition), and the backward decoding sub-step will be now described.

The first sub-step 601 of this backward decoding step is provided for collecting initial points. As the tracking of the contours during the backward decoding step will follow a path inverse of the one established during the forward decoding step, the set of the initial points for this inverse tracking is obtained (connection 81) from the buffer of closing points, created during the sixth sub-step 506.

A detection of the inverse tracking is then carried out in a second sub-step 602. In order to create the inverted cells, the input contour and the orientation and type of each cell have to be available. The input contour can be obtained either from the buffer of the closing points, if it is an initial point of a contour segment in the inverted tracking, or by the output contour of the previous inverted cell. The orientation and type information of the inverse cell is directly obtained from the buffer of the cell characteristics created during the forward decoding step. The output of the inverted cell is obtained by checking the marks of the seven possible output contours: the output contour is the one marked with the previous "sure_input" index (it may be noted that this output contour cannot be obtained by tracking the contour in the interior of the cell, since some contour segments may have been opened during the forward decoding step).

A third sub-step 603 is then provided for an error control. Once an inverted cell has been correctly established, possible open contours within the cell have to be defined, which is done only on the basis of the link between the input and output contours of the cell (i.e. of the link between the output contour with the highest priority and the input contour of the direct cell, respectively) The definition of this link is the only necessary task. If the cell presents some uncertainty (it should be only in the central pixel), it will be solved when fixing the longest path in the cell (i.e. the path linking, in the direct cell (the input contour and the output contour with the highest priority).

The error control sub-step 603 allows to update the marks of the site contours in the cell. Site contours with the mark "likely" or "unlikely" may receive either marks as "sure_link" or "sure_not", if no uncertainty is given, or a new mark "more_likely" if some uncertainty remains. This new mark denotes that, after the analysis of the cell in the inverse sense, these concerned contour points are proposed as belonging to the partition (such a new type of mark is necessary to make a difference between the proposal in the forward decoding step and the one in the backward decoding step). The marking of contour sites as "sure_link" or "more_likely" may lead to new multiple points in the cell. If contour sites previously marked as "likely" contact those updated to "sure_link" or "more_likely", they will be marked as "sure_not" or "unlikely", and future inverted cells will close the contour.

Figure 39:
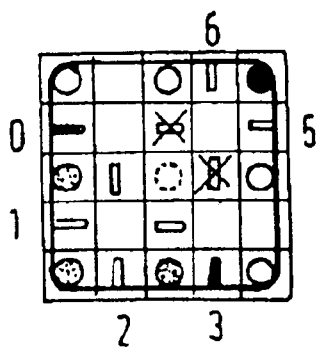
Figure 40:
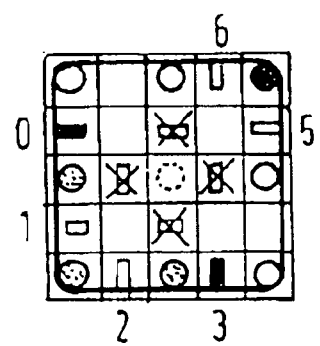
Figure 41:
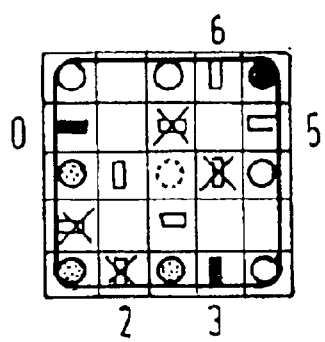

An example of this kind of decision is presented in FIGS. 39 to 41. FIG. 39 illustrates a situation in which, in the forward decoding step, the sub-chain had a unique symbol 3 and the cell had contour elements 1, 2, 5, 6 previously marked as "likely". As a result of the third sub-step 503 of the forward decoding step (contour generation in each cell), contour sites 8 and 9 are marked as "likely" and 10 and 11 as "unlikely". In the fifth sub-step 505 (error control sub-step) of the forward decoding step, the contours linking the input 0 and the output had been opened, and they are then updated to "unlikely", as illustrated in FIG. 40. In the error control sub-step 603 of the backward decoding step, it is decided to mark the contour elements 8 and 9 as "more_likely" and 10 and 11 as "unlikely", as illustrated in FIG. 41 (this choice is arbitrary, and the opposite one could be adopted). Furthermore, since this configuration creates a new triple point, outputs 1 and 2 are updated to "unlikely" (see also FIG. 41).

In the previous case, the new contour sites marked as "more_likely" contact other contour sites marked as "likely". In the case of the creation of new multiple points by contacting a pair of contour sites, marked as "more_likely", with another pair marked as "sure_link" or "more_likely", the inconsistency should be solved in another way. Such situations, in which the analysis of the partition should be extended outside the current cell, correspond to a wrong choice made in previously backward decoded cells and, as a result of that, two different kinds of inconsistencies may appear.

The first kind of inconsistencies appears when a single-pixel region is created, which may occur for the central pixel of the cell or on the pixels in the center of the cell sides (i.e. for pixels not being in any corner of the cell). The four contour sites around such pixels are then marked as "sure_input", "sure_link", "sure_output", "more_likely" or "likely". At least one of the contour sites will be either "more_likely" or "likely", and one of the contours marked as "likely" (it is the first choice) or "more_likely" (it is the second choice) is updated to "unlikely" (this update does not open the contour since the other three contour points ensure a closed contour). For solving an inconsistency on one of the pixels in the center of the cell side, only one contour cell that is external to the cell has to be analyzed (since this case occurs very seldom and the external contour site is close to the cell, this procedure remains local and does not increase the complexity of the method).

The second kind of inconsistency appears when regions are split into two unconnected regions, which may occur in regions that have a diagonal elongation of one pixel width. If the pixel that forms this elongation is on one of the corners of the cell, its contours in the cell may be updated to "more_likely", splitting the region into two ones.

Figure 42:
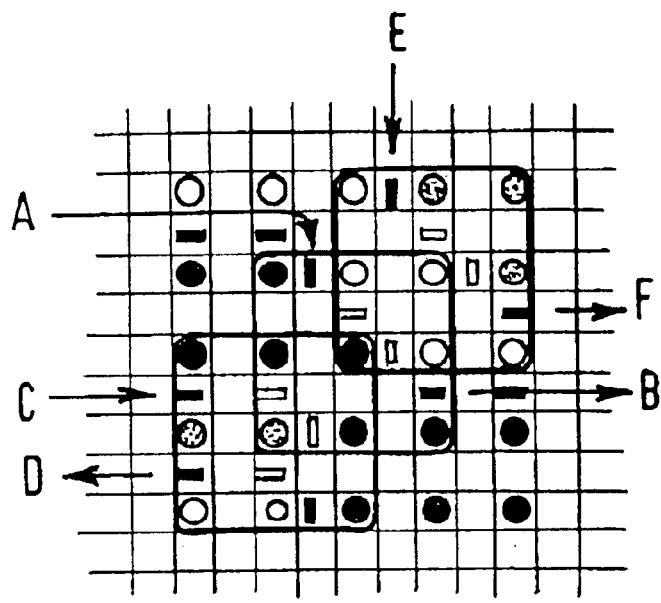

One contour configuration leading to this case is illustrated in FIGS. 42 to 45. A part of an original contour image and its coding is shown in FIG. 42. The set of cells that will create the inconsistency are presented with arrows and letters marking the contour tracking: the first cell AB is coded with the sub-chain 3, the second one CD, that presents a multiple point, is coded with the sub-chain M13, and the last one EF only requires a single symbol 3.

Figure 43:
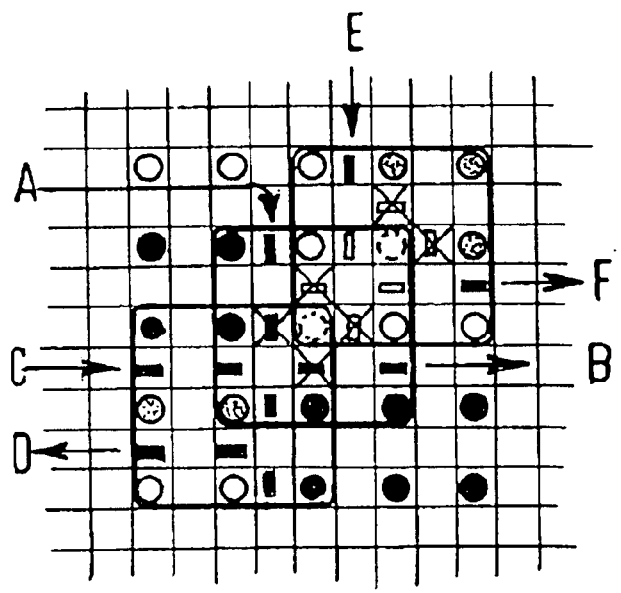

FIG. 43 illustrates the forward decoding step. The "likely" marks created by the decoding of the symbol 3 of the cell AB are updated when decoding the cell CD. Since the sub-chain M13 does not introduce any uncertainty, all the interior contours are marked as "sure_link". The contact with the outputs 5 and 6 that were marked as "likely" by the cell AB leads to a new multiple point. To solve this problem, the marks of the outputs 5 and 6 are updated to "sure_not". The decoding of the cell EF marks the interior contour sites 8 and 9 as "unlikely" and 10 and 11 as "likely".

The backward decoding step starts by decoding the first inverted cell ZY (see FIG. 44) and, as shown in said figure, updates the contour sites 10 and 11 (indexes of the inverted cell) to "more_likely". The process does not change any mark in the second inverted cell XW. Finally, the internal contour sites 8 and 9 of the third cell VU are marked as "sure_link". When marking the contour sites 8 and 9, an inconsistency is created since the two outputs 1 and 2 are marked as "more_likely". At this stage, the region marked with white pixels is split into two ones and the process requires to update the two contour sites 1 and 2 of the cell VU marked as "more_likely" to "sure_not".

Figure 44:
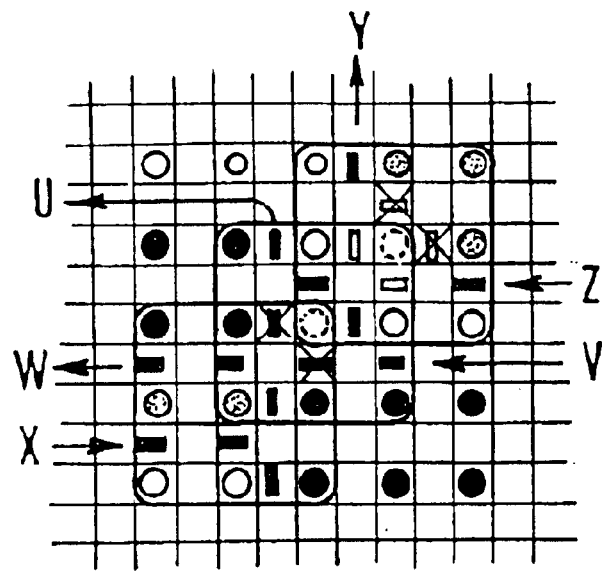
Figure 45:
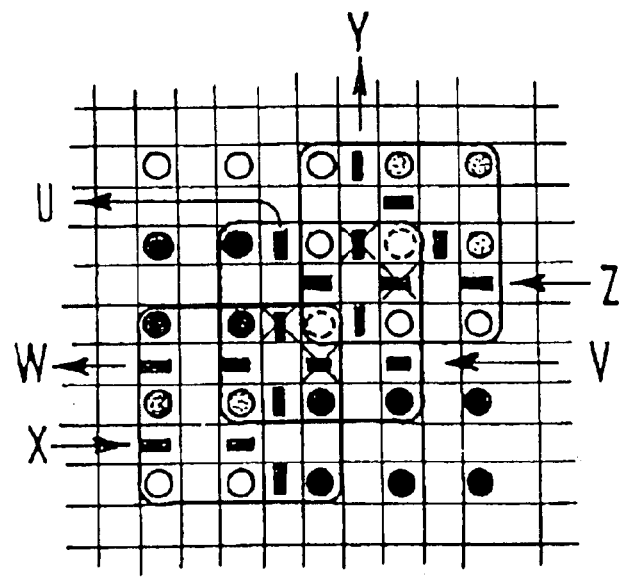

The way to detect the existence of this type of problems is the fact that a "more_likely" mark has been updated, i.e. a decision previously taken during the backward decoding step has been changed. This has to be solved (since no further analysis will be done on those contours), which is realized by a propagation of the updating of the contour marks through the partition. In this case, the propagation requires the analysis of contour pixels external to the cell. Nevertheless, the inconsistency is solved only acting on pairs of contour sites that are in the direction of the diagonal line linking the central point of the cell and the corner of the cell causing the problem. In the example of FIG. 44, the update performed on the contour sites 1 and 2 of the cell VU has to be propagated in the direction of the diagonal. As shown in FIG. 45, the pixels 8 and 9 of the cell ZY are thus marked as "sure_link" (it may be noted that the number of pairs of contour sites to be updated is fixed by the number of neighbour parallel regions of one pixel width that the propagation will find: obviously, such cases appear very seldom and, if they appear, the number of parallel regions is rather small, which has for a consequence that the process remains local and does not increase the complexity).

A fourth sub-step 604 allows to close a contour (test 641: end of contour?) or the partition (test 642: end of partition?). The end of a contour in the inverse tracking is detected when, from the last output contour, the cell created using the cell characteristics does not find a pixel marked with the previous index "sure_input" (if the contour is not ended, a backward connection 77 towards the sub-step 602 is provided). As explained in the description related to the closing sub-step 506 of the forward decoding step, initial points are marked with the index "sure_input+1" and this gap in the indexing order denotes the end of the contour segment in the inverse tracking. In this case, a new initial point is obtained from the buffer of closing points, and the characteristics of the cell already extracted are used to build up the new cell in this location. In the backward decoding step, the concept of cluster of regions is not preserved, as all the initial points of contour segments have been stored in the buffer of closing points without any distinction. Therefore, the method only checks (after having detected the end of a contour segment) whether there are initial points in the buffer of closing points (backward connection 78 towards the sub-step 501). The partition is completed when the buffer is empty.

A fifth and last sub-step 605 is provided for the generation of a label image. The final contour image is created taking all the contours marked as "frame", "sure_input", "sure_link", "sure_output" and "more_likely". From this contour image, a conventional method of partition creation is applied in order to obtain the final label image.

The invention such as described hereabove is by no means limited to the embodiment mentioned and shown, and alternatives or improvements can be proposed on the basis thereof.

It is known, for instance, that the method of coding segmented pictures described in the european patent application n°99400436.4 already cited can be extended either to a scalable-mode coding approach or to an inter-mode coding approach. These approaches will be recalled before describing corresponding decoding approaches.

Concerning the scalable-mode coding approach, only the case of two layers (a basic one and an enhancement one) will be described, but the description can be extended to the case of several layers.

Figure 46:
Figure 47:
Figure 48:
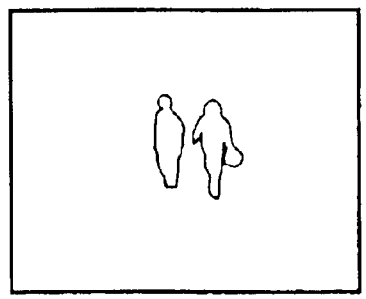
Figure 49:
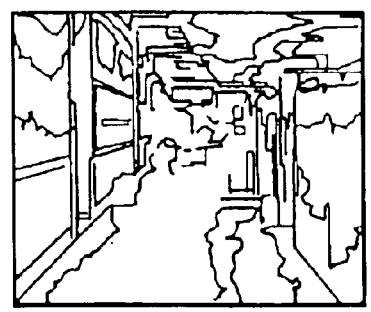

Given a partition, a sub-set of its contours may be sent separately, forming a coarse representation which constitutes the basic layer. The remaining contours, constituting the enhancement layer that allows to form with the basic one the complete partition, may be sent in a posterior step. This is illustrated in FIGS. 46 to 49, where a complete partition of the image shown in FIG. 46 is presented in FIG. 47, the basic layer is shown in FIG. 48, and FIG. 49 contains the contours associated to the enhancement layer (the definition of the basic layer may depend on the applications, and different sets of contours can be selected to form respectively the two layers: in the example of FIGS. 46 to 49, the two layers have been chosen to address the separate coding of specific objects, the basic layer corresponding to the shape of the two persons).

The coding of the basic layer is done according to the previously described method in order to keep the coding efficiency of said basic layer as high as if it was the only information to be transmitted (no additional symbols are included in the bitstream of the basic layer). For encoding the enhancement layer, some steps of the intra-mode MGCC method require changes with respect to the coding of the basic layer, especially the step of extraction of the initial points. The MGCC approach codes the basic layer addressing each cluster of regions separately. In the case of the enhancement layer, clusters of contour segments are addressed. In the intra-mode MGCC method, initial points contacting the frame are coded exploiting the fact that the frame is known at the decoding side. Further profit is taken from this concept, as, in the scalable mode, the receiver knowns the complete basic layer (with the exception of the uncertainty pixels in the center of the MGCC cells). The initial points of the enhancement contour segments are directly located on known contours: these are all the contours marked as "FRAME" or "INOUT" during the basic layer coding process. Known contour elements, used as initial points, are indexed scanning the image from top to down and from left to right.

It must be noted that initial points cannot be defined as neighbour contour sites of the known contour as it is done in the intra-mode MGCC method. Unlike when coding initial points contacting the frame in said intra-mode MGCC method, two initial contour sites are possible in the case of using as reference any other known contour element. Contour points from the basic layer contacting the enhancement layer are therefore stored in a buffer of possible initial points and marked as "PENDING".

If there are no contour points contacting the basic partition, the process progresses down to the "end of partition" step and, if there is any interior region in the image, it extracts the initial contour point of the first region. Given such an initial point, the same orientation and cell type as defined at this specific location when coding the basic layer are used. The characterization of cells not containing initial points does not vary. As previously, contour sites inside the cell that are not linked with the initial contour are withdrawn. In addition, contours belonging to the basic partition are only taken into account as initial or closing points of an enhancement contour segment. The management of multiple points and priorities in the contour tracking is not modified with respect to the case of the basic layer.

In the enhancement layer, the end of a contour segment relies on the contour elements from either the basic layer or the enhancement one previously marked as "INOUT" during the tracking step. If the output contour is that of highest priority, the end of the contour segment is reached. In addition, if the output contour is marked as "INTERNAL" (from the basic layer or the enhancement one) or "PENDING" (only from the enhancement layer), but any of the following contour sites that can be reached from it is an "INOUT" one, the contour (or the branch) is ended as well. Finally, the end of cluster and the end of partition are detected as in the intra-mode MGCC method.

Figure 50:
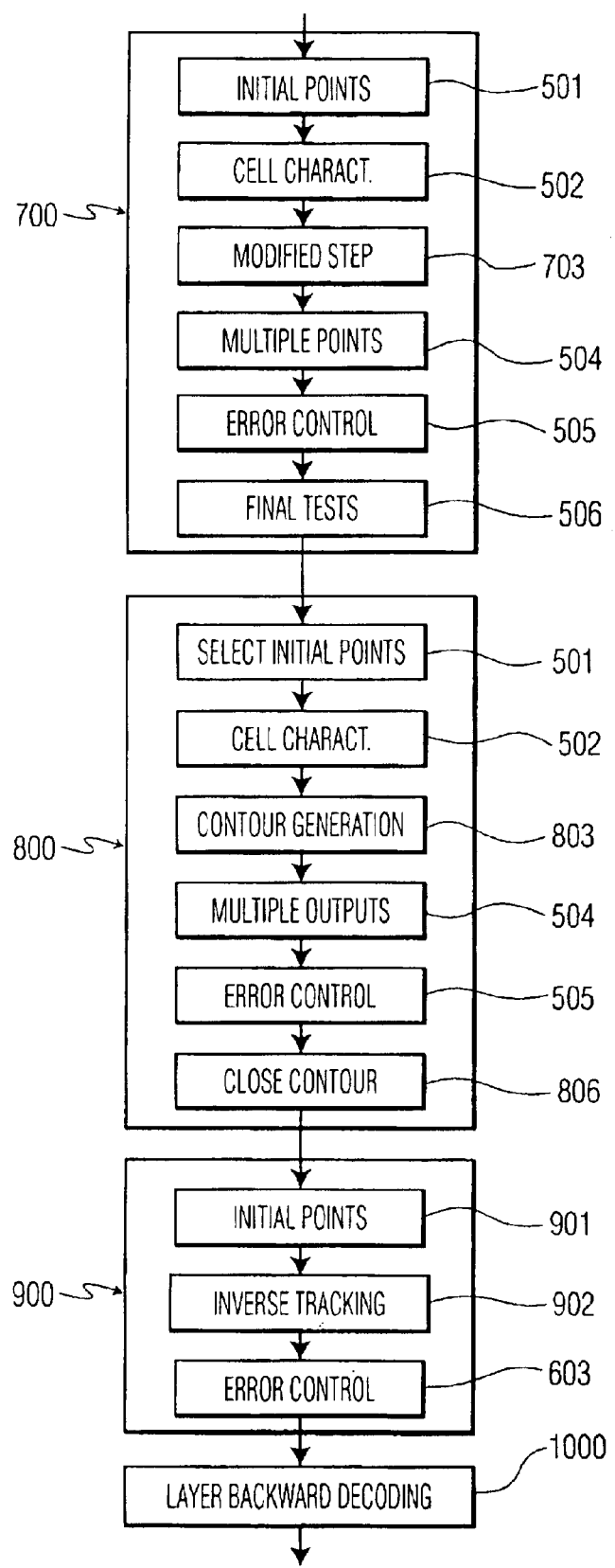

A decoding approach corresponding to that scalable-mode coding technique is the following. The independent coding of the basic layer and the enhancement one is also possible at the decoding side. However, when the complete partition has to be represented, the decoding of both layers is interleaved, according to the following steps, described in relation with FIG. 50.

The basic layer is first forward decoded (basic layer forward decoding step 700), but its backward decoding will be postponed. The six sub-steps of this forward decoding step of the basic layer are the same as indicated previously in relation with the first implementation, except the third one, the sub-step for the contour generation in each cell, which is replaced by a sub-step 703 (see FIG. 50). In this modified sub-step 703, when analyzing a cell, the use of the mark "sure_not" should be restricted. This mark could be used in the case of the first implementation (intra-mode) since some symbols, relying on the ordering of the multiple outputs, prevented the existence of some active contour sites (this is the case of the examples shown in FIGS. 20 to 22 or in FIG. 34). However, in the scalable-mode, these sites must not be marked as "sure_not" since the coding of the basic layer has been done without taking into account the existence of the enhancement layer. This way, a contour site that was non-active in the basic layer may become active in the enhancement layer.

The information of the enhancement layer is now decoded taking into account the already decoded basic layer. An enhancement layer forward decoding step 800 is first provided, and it is followed by an enhancement layer backward decoding step 900, itself followed by the postponed basic layer backward decoding step 1000.

The step 800 comprises, as the basic layer forward decoding step 700, six sub-steps:

(a) selection of the initial points (sub-step 801): the initial points of the enhancement contour segments can only be initial points of clusters of regions or points from the basic partition (those marked as "frame" or as "sure_input"). If there are several contour segments starting from the basic partition, the first one is selected as initial point and the other ones are stored in a buffer (a FIFO queue) of initial points on the basic partition. If there is no contour starting from the basic partition, the chain starts with the position of the initial point of an interior cluster of regions.

(b) cell characterization (sub-step 502): this sub-step does not vary from the basic layer forward decoding step to the enhancement layer one.

(c) contour generation in each cell (sub-step 803): as the marks introduced by the basic layer forward decoding step 700 are here used, input contours of cells may already have the mark of "sure_input" from the basic layer. Since these marks are necessary for the basic layer backward decoding step 1000, they cannot be erased. Some contour points therefore receive two marks, each one associated to a different layer. The input contour to a cell is marked as "sure_input_enh" ("enh", for enhancement) and the output contours as sure_output_enh"). As in the basic layer, the mark "sure_input_enh" corresponds to a set of values that indexes the order in which the different input contours are being chained. Depending on the contour configuration, some contour sites can be marked as "sure_not" or "sure_link"; this mark can be used in the enhancement layer, since the encoding of this layer already takes into account all the partition information.

(d) management of multiple outputs (sub-step 504), and:

(e) error control (sub-step 505): these two sub-steps 504 and 505 do not vary from the basic layer forward decoding step to the enhancement layer one.

(f) closing of contour or partition (sub-step 806): as in the basic partition, the index of "sure_input_enh" is incremented when an initial point is extracted from any of the buffers.

The step 900 only comprises three sub-steps (no closing sub-step is provided, since the basic layer has still to be backward decoded):

(a) selection of the initial points (sub-step 901): as the enhancement layer backward decoding step 900 tracks the contours following the inverse path established by the enhancement layer forward decoding step 800, the set of initial points for said inverse tracking is obtained from the buffer of closing points created in said enhancement layer forward decoding step.

(b) detection of the inverse tracking (sub-step 902): this sub-step is similar to the one carried out in the intra-mode (sub-step 502), except the fact that it must now take into account that the index to be followed is "sure_input_enh".

(c) error control (sub-step 603): this sub-step does not vary from the basic layer backward decoding step to the enhancement layer one.

The basic layer backward decoding step 1000 can now be carried out. The end of a contour in the inverse tracking is detected when, from the last output contour, the cell created using the cell characteristics does not find a pixel marked with the previous index "sure_input_enh". On turn, the end of partition is detected as in the intra-mode. Contours are closed and inconsistencies are solved, preserving (as much as possible) previous marks.

What is claimed is:

1. A method of decoding coded signals corresponding to successive segmented pictures, or partitions, divided into homogeneous regions to which specific labels are respectively associated, said partitions having been coded by means of a coding method comprising, for each partition to be coded, the steps of:

translating the picture of labels into a description in terms of a contour elements chain in which the elements are defined by means of their movements through successive basic cells, between an input point and an output point of said cells;

tracking inside each successive cell each contour from its initial contour point, previously extracted, to its end by storing chain symbols corresponding both to input, internal and output elements of said cell and to priorities between possible multiple outputs elements;

repeating these steps up to the end of each contour of the partition and coding the information corresponding in each cell both to the initial point of each contour segment and to the associated chain of movements between that initial point and the initial one of the following cell;

said decoding method being characterized in that it comprises:

(A) a forward decoding step, provided for decoding within said chain symbols all contour points that are sure in the decoded partition and detecting local inconsistencies;

(B) a backward decoding step, provided for tracking in a backwards manner the decoded contours and solving said inconsistencies on the basis of marks introduced during the detection of these inconsistencies; without storing an original coded bitstream, which is not used during the backward decoding step.

2. A method of decoding coded signals corresponding to successive segmented pictures, or partitions, divided into homogeneous regions to which specific labels are respectively associated, said partitions having been coded by means of a coding method comprising, for each partition to be coded, the steps of:

translating the picture of labels into a description in terms of a contour elements chain in which the elements are defined by means of their movements through successive basic cells, between an input point and an output point of said cells;

tracking inside each successive cell each contour from its initial contour point, previously extracted, to its end by storing chain symbols corresponding both to input, internal and output elements of said cell and to priorities between possible multiple outputs elements;

repeating these steps up to the end of each contour of the partition and coding the information corresponding in each cell both to the initial point of each contour segment and to the associated chain of movements between that initial point and the initial one of the following cell;

said decoding method being characterized in that it comprises:

(A) a forward decoding step, provided for decoding within said chain symbols all contour points that are sure in the decoded partition and detecting local inconsistencies;

(B) a backward decoding step, provided for tracking in a backwards manner the decoded contours and solving said inconsistencies on the basis of marks introduced during the detection of these inconsistencies; wherein said forward decoding step (A) comprises the sub-steps of:

(a) ordering the set of received initial points;
(b) reconstructing the type of cell to be decoded;
(c) using in each chain the sub-chain information associated to a cell and the contours already available in the area covered by the cell to define a contour configuration describing said sub-chain;
(d) selecting which multiple output points lead to initial points of new contour segments and storing them;
(e) detecting and marking possible contour inconsistencies within the cells;
(f) repeating the previous sub-steps (b) to (e) up to the end of each contour segment;

(B) said backward decoding step comprises the sub-steps of:

(g) recuperating the set of initial points for the inverse tracking;
(h) recovering the characterization of each inverse cell from the stored data and from the analysis of said marks;
(i) closing the open contours and solving contour inconsistencies outside the cells;
(j) closing each contour and the partition;
(k) creating the final contour image linking the marked contour elements and generating a corresponding final label image.

3. A decoding method according to claim 2, characterized in that, when each current partition had been previously divided into a basic layer and at least an enhancement one, said layers having been then successively coded, with, for the coding of the enhancement layer, the following modifications:

in the extraction step, the initial points of contour segments are associated to contour points from the basic layer;

in the tracking step, all the points belonging to the basic layer are withdrawn;

in the repeating step, the closing of a contour before processing the following one is associated to contour points of the basic and enhancement layers;

then the decoding of both basic and enhancement layers is interleaved, the basic layer being first forward decoded, the enhancement layer being then forward and backward decoded, and the basic layer being finally backward decoded.

4. A method of decoding coded signals corresponding to successive segmented pictures, or partitions, divided into homogeneous regions to which specific labels are respectively associated, said partitions having been coded by means of a coding method comprising, for each partition to be coded, the steps of:

translating the picture of labels into a description in terms of a contour elements chain in which the elements are defined by means of their movements through successive basic cells, between an input point and an output point of said cells;

tracking inside each successive cell each contour from its initial contour point, previously extracted, to its end by storing chain symbols corresponding both to input, internal and output elements of said cell and to priorities between possible multiple outputs elements;

repeating these steps up to the end of each contour of the partition and coding the information corresponding in each cell both to the initial point of each contour segment and to the associated chain of movements between that initial point and the initial one of the following cell; wherein said decoding method being characterized in that it comprises:

(A) a forward decoding step, provided for decoding within said chain symbols all contour points that are sure in the decoded partition and detecting local inconsistencies;

(B) a backward decoding step, provided for tracking in a backwards manner the decoded contours and solving said inconsistencies on the basis of marks introduced during the detection of these inconsistencies; wherein when each current partition had been previously divided into a basic layer and at least an enhancement one, said layers having been then successively coded, with, for the coding of the enhancement layer, the following modifications:

in the extraction step, the initial points of contour segments are associated to contour points from the basic layer;

in the tracking step, all the points belonging to the basic layer are withdrawn;

in the repeating step, the closing of a contour before processing the following one is associated to contour points of the basic and enhancement layers;

then the decoding of both basic and enhancement layers is interleaved, the basic layer being first forward decoded, the enhancement layer being then forward and backward decoded, and the basic layer being finally backward decoded.

\* \* \* \* \*